UNITED STATES PATENT OFFICE.

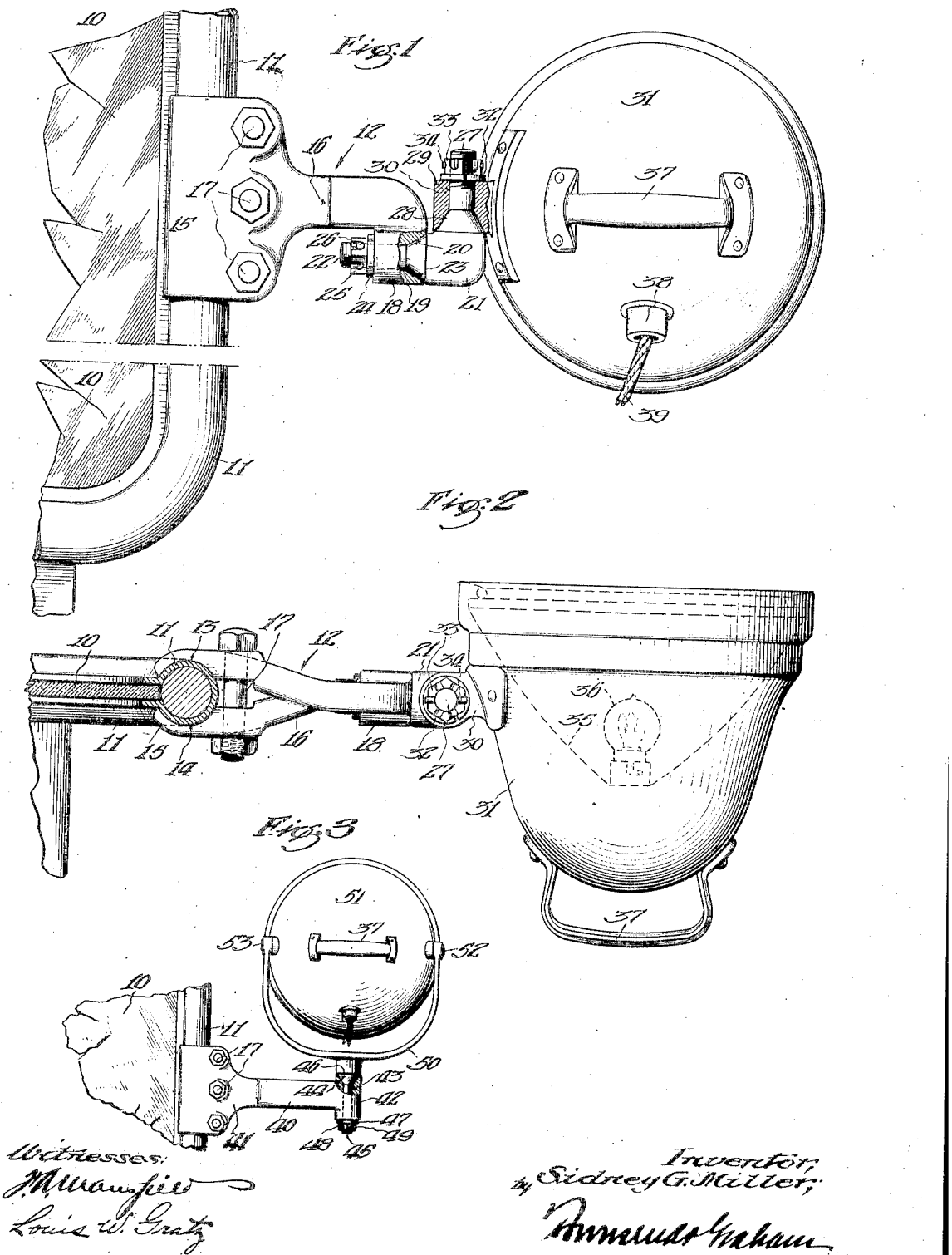

SIDNEY G. MILLER, OF LOS ANGELES, CALIFORNIA.

AUTOMOBILE-LAMP.

1,108,512.   Specification of Letters Patent.   Patented Aug. 25, 1914.

Application filed September 8, 1913. Serial No. 788,761.

*To all whom it may concern:*

Be it known that I, SIDNEY G. MILLER, a citizen of the United States, residing at Los Angeles, in the county of Los Angeles and State of California, have invented a new and useful Automobile-Lamp, of which the following is a specification.

My invention relates to lamps for vehicles and more particularly to automobile lamps.

The particular object of my invention is to provide a lamp which may be fastened upon the wind shield of an automobile, and which is adapted to be turned at any angle to said wind shield, so that its light may be projected either upon the road ahead or upon any other object which it is desired to illuminate.

A further object of my invention is to provide a new and novel form of friction joint for the purpose of insuring that the lamp remain in position when once adjusted.

Further objects and advantages will appear hereinafter.

Referring to the drawings, which are for illustrative purposes only: Figure 1 is an elevation partly in section of my invention, as applied to the wind shield of an automobile. Fig. 2 is a plan view partly in section of the apparatus shown in Fig. 1. Fig. 3 is an elevation of an alternative form of my invention.

In the embodiment of my invention illustrated in Fig. 1 and Fig. 2, 10 is a transparent wind shield of an automobile which is provided with a frame 11 ordinarily made of metal and of circular section.

12 is a bracket provided with a depression in the end 13 thereof, this depression being of a suitable size and shape to grip the member 11. A clamp 14 is provided having an end 15 of similar section to the end 13 and having an end 16 adapted to bear upon the bracket 12. Bolts 17 are provided passing through the members 11 and 14 clamping them firmly together, and clamping them upon the member 11. The bracket 12 is also provided with an end 18 through which is bored a hole 19, the hole having a conical seat 20. A knuckle 21 is provided having a threaded projection 22 adapted to pass through hole 19 and having a conical shoulder 23 adapted to bear upon the conical seat 20. A spring lock washer 24 is provided and a castellated nut 25, which may be held in place by a pin 26, passing through the projection 22, is also provided. The knuckle 21 has a threaded projection 27 provided with a conical shoulder 28, this projection 27 passing through a hole 29 in a lug 30, which is riveted or otherwise secured to the lamp 31. A spring washer 32 and a castellated nut 33 secured by a pin 34 are provided to secure the projection 27. The lamp 31 may be of any convenient form, that shown being provided with a parabolic reflector 35 and an incandescent lamp 36, a handle 37 being provided at the rear thereof for manipulation. A gas burner may be substituted for the incandescent lamp 36, the supply therefor being taken through the bushing 38, through which the electric wires 39 for supplying the lamp 36 are shown as passing.

In the alternative form shown in Fig. 3 I supply a bracket 40, held in place by a clamp 41, these members being somewhat similar in form to the members 12 and 14 described above. The bracket 40 is provided with an end 42 which has a hole 43 extending therethrough, the hole being provided with a conical seat 44 as shown. Extending through the hole 43 is a threaded projection 45 provided with a conical shoulder 46, a spring washer 47, and a castellated nut 48 held in place by a pin 49. This projection 45 is formed on the clevis 50, which extends upward on each side of the lamp 51, which is of exactly similar construction to the lamp 31, the clevis 50 being provided with trunnions 52 and 53 in which the lamp turns.

My device may be clamped upon the wind shield of an automobile as shown, and the method of operation thereof is as follows:

Electric current, gas or other illuminating means being supplied to the lamp 31, it is adjusted to bear upon the road ahead of an automobile or upon any other objects which it is desired to illuminate by gripping the handle 37. The lamp turns in a horizontal plane around the projection 27 or in a vertical plane around the projection 22, a combination of these two movements enabling the lamp to be turned any direction desired. In the form of lamp shown in Fig. 3, the lamp turns in a horizontal plane around the projection 45 and in a vertical plane upon the trunnions 52 and 53.

My invention should not be confused with the ordinary forms of automobile searchlights, which are large and which must be located upon complicated and heavy brackets upon the side of the machine.

My invention is adapted to be readily attached to the wind shield of an automobile without the necessity of additional brackets or supports.

I claim as my invention:

An automobile lamp and support, for use on an automobile having a wind shield with a tubular frame, comprising a bracket adapted to be clamped to said frame, a clamp adapted to engage said frame and to clamp said bracket to said frame, a fastening means between said clamp and said bracket, a knuckle having a pivot with a conical seat, said pivot being elastically secured in said bracket, a pivot having a conical seat at right angles to said first named pivot and a lamp pivoted upon said last named pivot, said pivot being elastically secured therein.

In testimony whereof, I have hereunto set my hand at Los Angeles, California, this 25th day of August, 1913.

SIDNEY G. MILLER.

In presence of—
 FORD W. HAINS,
 FRED A. MANSFIELD.